United States Patent
Roberson

[15] 3,656,963
[45] Apr. 18, 1972

[54] HYDROLYZED PROTEIN OF REDUCED DUSTINESS AND PROCESS

[72] Inventor: William D. Roberson, Harbor Beach, Mich.

[73] Assignee: Hercules Incorporated, Wilmington, Del.

[22] Filed: Oct. 22, 1969

[21] Appl. No.: 868,621

[52] U.S. Cl. ..........................99/14, 99/140 R, 99/140 N, 106/154, 106/161
[51] Int. Cl. .........................................................A23l 1/22
[58] Field of Search ...............................99/14–18, 140, 99/140 R

[56] References Cited

UNITED STATES PATENTS

| | | | |
|---|---|---|---|
| 2,946,686 | 7/1960 | Gaver et al. | 99/14 |
| 2,970,913 | 2/1961 | Loewenstein | 99/14 |
| 3,093,488 | 6/1963 | Graham et al. | 99/14 X |
| 3,362,829 | 1/1968 | Landfried et al. | 99/14 |
| 3,516,349 | 6/1970 | Bertullo et al. | 99/18 X |
| 2,832,685 | 4/1958 | Scott | 99/20 |

FOREIGN PATENTS OR APPLICATIONS 3,3-8,420  1958  Japan
1,097,064  1/1961  Germany

OTHER PUBLICATIONS

Salas et al. " Surface Active Agents Effects on Drying Characteristics of Model Food Systems" Food Tech. 22 1576– 1580 (1968).
Nagai, " Moistureproofing of Powdered Foods" Chem. Abs. 54:4963i (1960).
General Foods, " Dry Gelatin Powder Soluble in Cold Water" Chem. Abs. 56:7761 (1962).

Primary Examiner—Morris O. Wolk
Assistant Examiner—Sidney Marantz
Attorney—William S. Alexander

[57] ABSTRACT

A relatively dustless substantially dry composition including hydrolyzed protein and, as a dust proofing agent, a polyoxyethylene sorbitan monoester of a fatty acid, and process of preparing said composition.

3 Claims, No Drawings

HYDROLYZED PROTEIN OF REDUCED DUSTINESS AND PROCESS

The present invention relates to an improved hydrolyzed protein and process of preparing, the improvement being a hydrolyzed protein which is substantially dustless.

The term hydrolyzed protein is used herein in its usual and well understood sense to mean the purified hydrolyzate of a proteinaceous material.

In one conventional manufacture of powdered hydrolyzed protein a suitable proteinaceous (e.g., vegetable or animal) raw material including, e.g., soy flour, wheat gluten, corn gluten, cotton seed meal, peanut meal, unextracted yeast, meat meal, hoof and horn meal, hides, fish meal, dried blood, or mixtures thereof is hydrolyzed at an elevated temperature with a mineral acid (e.g., hydrochloric acid) to liberate the amino acids present in the raw material. The pH is adjusted to the desired level (normally about 3.8 to 5.8), the hydrolyzate is filtered to remove the insoluble humin cake, the pH is readjusted if necessary and the solution is spray dried to yield a water soluble hydrolyzed protein in the form of a powder having a moisture content not in excess of about 4 percent.

A very serious problem the prior art has is that the powdered hydrolyzed protein product is very dusty, making handling difficult in operations such as screening, blending, packaging, and various usage applications. The loss of hydrolyzed protein dust in these operations creates yield loss and housekeeping problems for both the manufacturer and user.

The prior art has attempted to minimize the problem of dustiness in hydrolyzed protein powdered products by coating the powdered hydrolyzed protein with an edible oil (e.g., cottonseed oil). However this technique leaves much to be desired. These oils are not water soluble or completely water dispersible. It is difficult to maintain a uniform composition in the feed to a spray drier. Water solutions of the powdered hydrolyzed protein products treated with oil are not clear and contain an oil film on the surface unless the solution is continuously and violently agitated. The oil also creates an undesirable taste and mouth feel in many food seasoning applications where the product is used either in the solution or powdered form.

In accordance with the present invention it has been found that dustiness is eliminated or at least minimized by drying an aqueous mixture of hydrolyzed protein and an antidusting agent comprising a polyoxyethylene sorbitan monoester of a saturated or unsaturated fatty acid having 12-18 carbon atoms. Preferably said antidusting agent will be either polyoxyethylene (20) sorbitan monolaurate, polyoxyethylene (20) sorbitan monopalmitate, polyoxyethylene (20) sorbitan monostearate, polyoxyethylene (20) sorbitan monooleate, or mixtures thereof.

The following examples illustrate the various embodiments of the present invention. In the examples and elsewhere percent is by weight unless otherwise indicated.

EXAMPLES 1-8

Variable: Amount of Antidusting Agent

In Examples 1-8, 0.5 gallon of a soy protein acid hydrolyzate at pH 5.4 and containing 3.5 lb. dry solids per gallon was used in each experiment. On a dry basis, the hydrolyzed protein contained 30.2 percent protein (N × 6.25), 53.5% NaCl, and about 7 percent monosodium glutamate (MSG). The solution was agitated at room temperature while the stated quantity of polyoxyethylene (20) sorbitan monooleate was added as the antidusting agent. Stirring was continued for 15 minutes after completing the addition of antidusting agent. The solution was then dried in a Swenson Spray Drier (3 ft. dia × 7 ft. high) under the following conditions:

| | |
|---|---|
| Drier inlet air temperature | 320°-350°F. |
| Drier outlet air temperature | 190°-225°F. |
| Two-fluid type nozzle (air and liquid) | 0.093 in. dia. |
| Liquid feed temperature | 75°F. |
| Feed pressure | 30-40 psig |
| Atomizing (air) pressure | 30-40 psig |

The dried products were analyzed for moisture content on a Cenco moisture meter at a 90-volt setting. The dusting characteristics of all of the samples were measured using a funnel-drop test. This apparatus consisted of a polyethylene funnel, 4⅛in. in diameter at the top and five-eights in. in diameter at the bottom. A 2-178 in. length of 11/16 in. I.D. rubber tubing was connected to the outlet of the funnel. The vertical height of the funnel was 4 inches. Twenty-five grams of sample was allowed to flow from the funnel into a tared aluminum dish. The dish was centered directly below the funnel at a distance of 12 inches between the bottom of the rubber tubing and the bottom of the dish. The alignment of the funnel and aluminum dish was maintained by using a funnel plate and dish guide. The dish was 3¼ inches in diameter at the top, 2 inches in diameter at the bottom and 1 inch high. The percent dust lost due to drifting or splattering from the dish was determined as follows:

$$\frac{25 \text{ g.} - \text{weight collected in dish (g)}}{25 \text{ g.}} \times 100 = \text{Percent dust loss}$$

Further details appear in Table 1 hereinafter.

TABLE 1

Variable: Amount Antidusting Agent

| Ex. No. | Antidusting Agent (1) %(2) | Dust Loss % | Product Moisture % |
|---|---|---|---|
| 1 | none (control) | 41.41 | 2.7 |
| 2 | 0.1 | 34.43 | 3.0 |
| 3 | 0.7 | 25.00 | 1.5 |
| 4 | 1.0 | 14.42 | 1.3 |
| 5 | 3.0 | 5.26 | 1.2 |
| 6 | 10.0 | 4.18 | 2.0 |
| 7 | 15.0 | 2.68 | 2.6 |
| 8 | 20.0 | 2.36 | 3.6 |

(1) Polyoxyethylene (20) sorbitan monooleate
(2) By weight of dry solids in hydrolyzate (hydrolyzed protein solution) used

EXAMPLES 9-13

Variable: Type Antidusting Agent

The process used in Examples 9-13 was substantially the same as for Examples 1-8. In all cases (except the control where none was added) the amount of antidusting agent used was 0.7 percent by weight of the dry solids in the hydrolyzate (hydrolyzed protein solution) used.

Further details appear in Table 2 hereinafter.

TABLE 2

Variable: Type Antidusting Agent

| Ex. No. | Type Antidusting Agent | Dust Loss % | Product Moisture % |
|---|---|---|---|
| 9 | none (control) | 41.41 | 2.7 |
| 10 | Polyoxyethylene (20) sorbitan monooleate | 12.78 | 2.3 |
| 11 | Polyoxyethylene (20) sorbitan monolaurate | 10.59 | 2.2 |
| 12 | Polyoxyethylene (20) sorbitan monopalmitate | 12.34 | 2.4 |
| 13 | Polyoxyethylene (20) sorbitan monostearate | 6.10 | 3.2 |

Following the general procedure given for Examples 1-13 hereinbefore several additional runs were carried out (in the plant in a Swenson-Gray-Jensen conical spray drier 18 feet in diameter at the top of the cone and 35 feet in height—previous runs were made in the pilot plant spray drier) on various types of hydrolyzed protein. The approximate ranges of conditions and results herein were as follows:

Dust loss reduction: at least 50% to almost 100%
Antidusting agent: 0.1–20% (polyoxyethylene (20) sorbitan monooleate used in these additional runs)
Product moisture: 0.9–5%
Volume material treated: 0.5–2600 gal.
Hydrolyzed protein compositions:
lbs. dry solids/gal.: 3.4–4.2
protein: 25–50%, dry basis
NaCl 35–55%, dry basis
MSG: 5–25%, dry basis
Drying conditions:
drier inlet air temp.: 260°–350°F.
drier outlet air temp.: 165°–225°F.
liquid feed temp.: 75°–160°F.
liquid feed pressure: 30–5500 psig When each product of the foregoing examples was dissolved in water it was observed that treatment of the hydrolyzed protein in accordance with the present invention was carried out without sacrifice of solution clarity (i.e., product was substantially free of the haziness of prior art oil coated hydrolyzed protein), flavor, and mouth feel. Neither was there any difficulty in maintaining a uniform composition in the feed to the spray drier as there is in prior art oil coated hydrolyzed protein.

As is well known, and as will be seen from the foregoing examples, the composition of the liquid hydrolyzed protein may vary widely but in general will contain 55–65 percent water and have the following analysis on a dry solids basis:

| Ingredient | % By Weight (dry basis) |
|---|---|
| Protein (%N X 6.25) | 25–50 |
| Total Chlorides (Calc. as NaCl) | 35–60 |
| $NH_4Cl$ | 0–6 |
| MSG | 0–30 |

It is known in the art that protein hydrolyzates may be prepared from suitable proteinaceous raw materials by the action of a proteolytic enzyme such as ficin, papain, trypsin, or mixtures thereof at ambient or slightly elevated temperatures or by the process of fermentation in the presence of a microorganism such as mold. It is also known in the art to add various other ingredients to the hydrolyzate, including, e.g., autolyzed yeast, inactive dry yeast, mononucleotides, caramel coloring, dextrin, and additional NaCl and MSG. This invention is applicable to hydrolyzed proteins prepared by acid hydrolysis, enzymatic hydrolysis, or hydrolysis by fermentation and to hydrolyzed proteins containing the aforementioned and other conventional ingredients. It is also applicable to widely varying conditions under which the hydrolyzed protein is dried. These prior art variables are applicable in the present invention and need no discussion here other than to make it clear that the present invention is not limited to these; they merely illustrate the approximate compositions of the preponderance of hydrolyzed protein products commercially available at present and the approximate drying conditions under which they are prepared in powdered form.

The foregoing examples show that amounts of antidusting agent within the range of 0.1–20 percent by weight of dry solids in the aqueous solution of hydrolyzed protein gave substantially improved results. Amounts as low as about 0.05 percent are applicable. Preferably the amounts will be about 0.7–3 percent.

It is important that the antidusting agent be added so that it will be dried along with the hydrolyzed protein (i.e., so that the two are co-dried). However the type of drying is not critical. Although spray drying is preferred drying methods in general are applicable including, e.g., spray drying, roll drying, oven drying, and pan drying under widely different conditions of temperature, pressure, time, and other variables.

Neither the time nor type of mixing used in preparing the hydrolyzed protein antidusting agent mixture prior to the drying is critical or even important as long as a substantially uniform mixture is obtained.

The moisture content to which the hydrolyzed protein is dried may vary considerably but it is not per se a part of the present invention. Although this value is not critical it is important as the art appreciates. Preferably the hydrolyzed protein will be dried to a moisture content of not in excess of about 5 percent, and more preferably to not in excess of about 4 percent. This is due primarily to the hygroscopic nature of the powdered hydrolyzed protein and its tendency to lump at high moisture contents.

For many years hydrolyzed protein has enjoyed a large market as a food seasoning.

As many apparent and widely different embodiments of this invention may be made without departing from the spirit and scope thereof, it is to be understood that the invention is not limited to the specific embodiments thereof except as defined in the appended claims.

What I claim and desire to secure by Letters Patent is:

1. Process of preparing a substantially dustless protein hydrolysate composition comprising preparing an aqueous solution of hydrolyzed protein and an antidusting agent consisting of a polyoxyethylene sorbitan monoester of a fatty acid having 12–18 carbon atoms and drying the resulting solution, wherein the amount of antidusting agent is about 0.05–20 percent by weight of solids (dry basis) in the aqueous hydrolyzed protein prior to drying.

2. Process of claim 1 wherein the antidusting agent is a member selected from the group consisting of polyoxyethylene sorbitan monolaurate, polyoxyethylene sorbitan monopalmitate, polyoxyethylene sorbitan monostearate, polyoxyethylene sorbitan monooleate, or mixtures thereof.

3. The composition produced by the process of claim 1.

* * * * *